United States Patent [19]

Kennedy

[11] Patent Number: 5,117,984

[45] Date of Patent: Jun. 2, 1992

[54] ADJUSTABLE CD STORAGE RACK

[75] Inventor: Timothy J. Kennedy, New York, N.Y.

[73] Assignee: Dreadnought Industries Inc., White Plains, N.Y.

[21] Appl. No.: 682,667

[22] Filed: Apr. 9, 1991

[51] Int. Cl.⁵ .............................................. A47F 7/00
[52] U.S. Cl. ....................................... 211/41; 211/40; 211/43
[58] Field of Search ............................. 211/40, 41, 43

[56] References Cited

U.S. PATENT DOCUMENTS

| | | | |
|---|---|---|---|
| 628,943 | 7/1899 | Kasik | 211/40 |
| 1,120,941 | 12/1914 | Jones | 211/40 |
| 1,674,359 | 6/1928 | Frey | 211/43 |
| 2,620,929 | 12/1952 | Sportsman | 211/43 X |
| 2,959,293 | 11/1960 | Van Meyer | 211/43 X |
| 3,171,542 | 3/1965 | Jacobs et al. | 211/43 |
| 4,162,013 | 7/1979 | Tucker | 211/43 |
| 4,600,110 | 7/1986 | Timor | 211/40 |
| 4,712,679 | 12/1987 | Lowe | 211/40 |
| 4,781,292 | 11/1988 | Sacherman et al. | 211/40 X |
| 4,928,816 | 5/1990 | Zusy | 211/40 X |

FOREIGN PATENT DOCUMENTS

| | | | |
|---|---|---|---|
| 1421815 | 11/1965 | France | 211/40 |
| 0261537 | 11/1926 | United Kingdom | 211/43 |
| 0720954 | of 1954 | United Kingdom | 211/40 |

*Primary Examiner*—Robert W. Gibson, Jr.
*Attorney, Agent, or Firm*—Levisohn, Lerner & Berger

[57] ABSTRACT

This invention discloses an adjustable CD storage rack to hold a plurality of CDs such that a side edge and front face of the CDs are normally observable, with the storage rack formed by a pair of spaced end supports movable on rods with respect to each other to adjust the storage size of said rack. The rods slide through aligned apertures in the side edges to slidably yet fixably be set at any location along said rods. The rods form the support structure on which the CDs rest, preferably side-by-side.

9 Claims, 4 Drawing Sheets

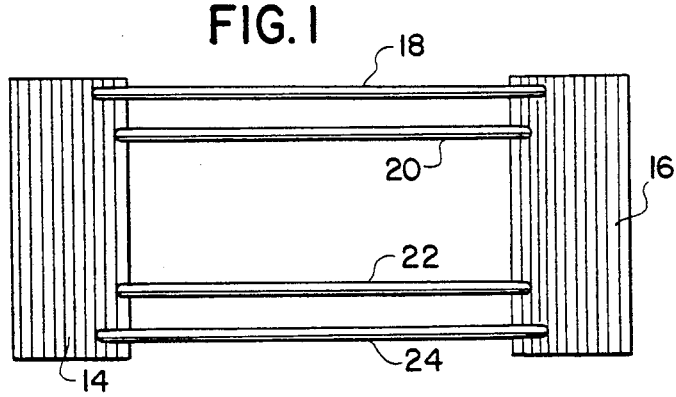
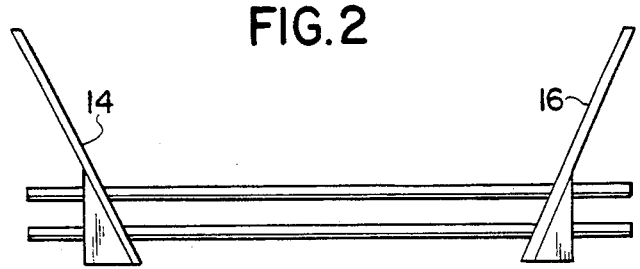
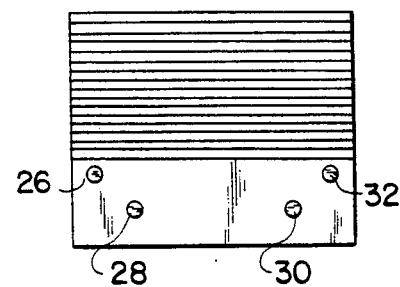
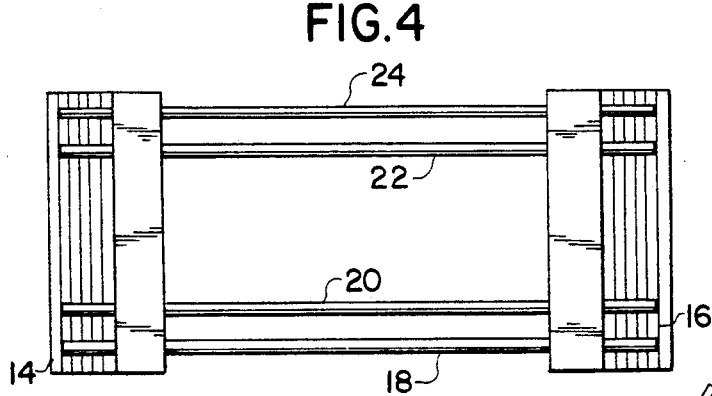
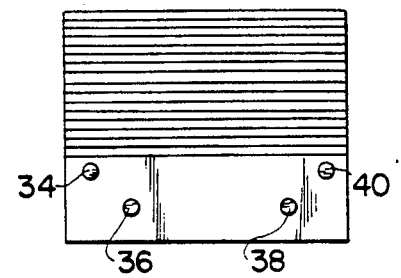
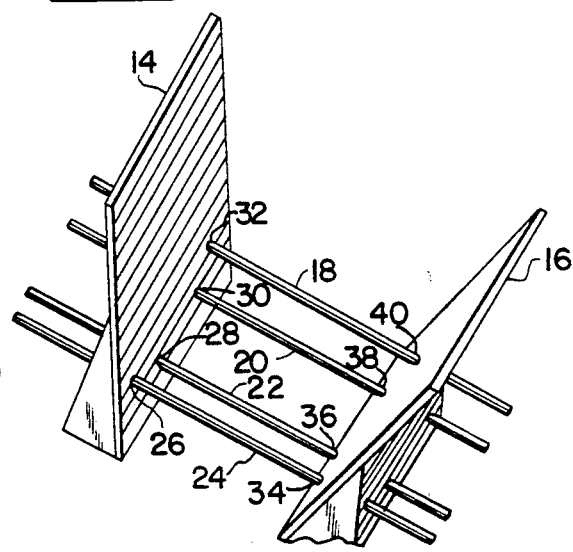

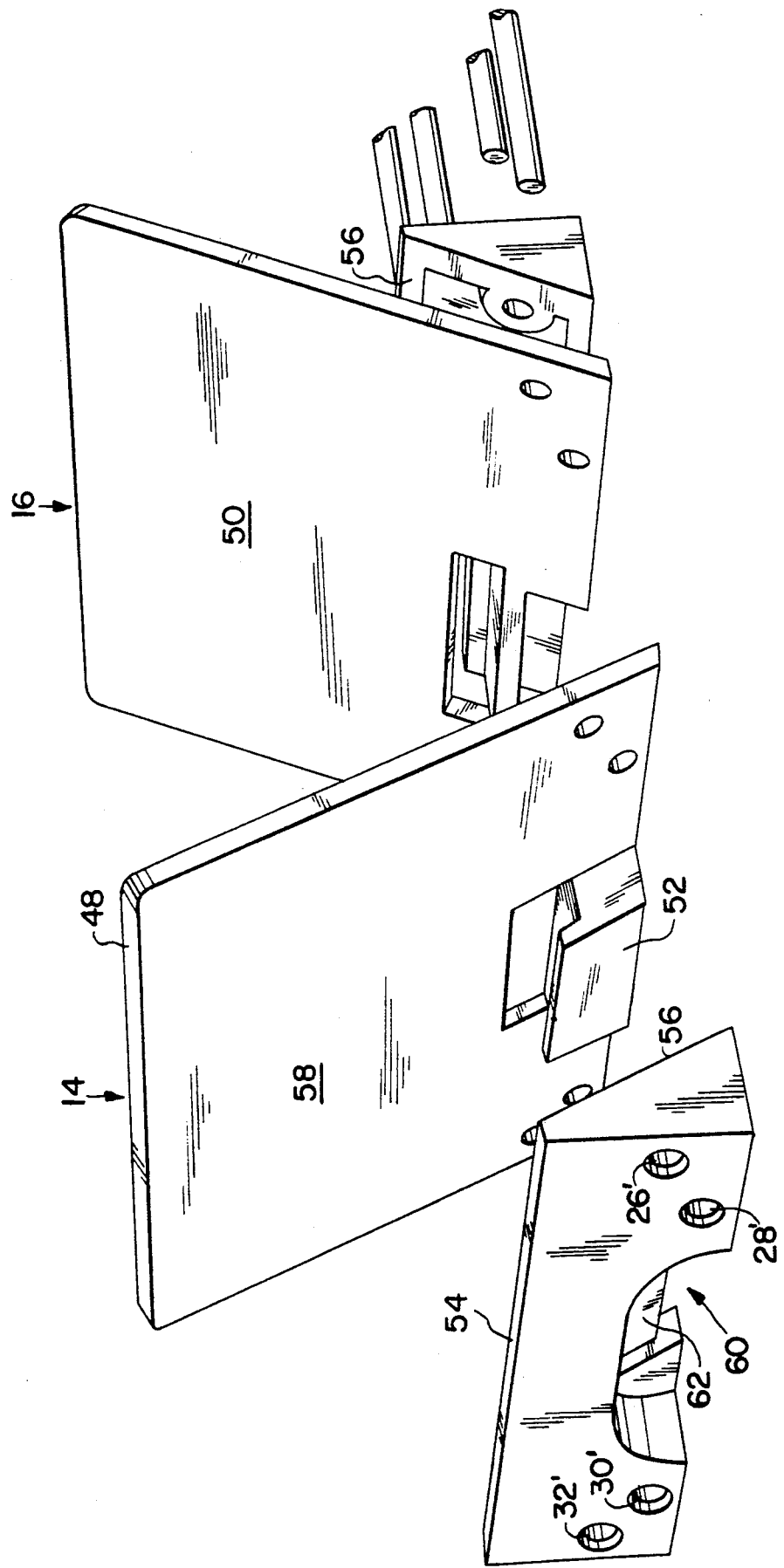

ADJUSTABLE CD STORAGE RACK

BACKGROUND OF THE INVENTION

This invention relates to a rack for storing compact disks ("CDs"), and more particularly, to such a rack which allows for a varied number of CDs to be stored in a manner which enables the contents of the CDs to be easily observed.

CDs come in thin rectangular packages with thin side edges and a large front face. Information about the contents of the CD is generally carried along an edge as well as along the front and rear faces of the CD packages. CDs are stored generally standing on edge, side-by-side, with the user having to closely inspect the side edges to select the CD to be played.

Since the CD as stored in thin plastic rectangular boxes, they tend to fall without side support. Generally, there have not been available CD storage racks which allow for CDs to be stored in a neat fashion and which also allows the CDs to be observed along their side edge and front faces, substantially simultaneously. Additionally, it is desirable to provide a storage rack for CDs which is adjustable, handling any number of CDs sought to be stored in the rack as desired.

An object of this invention is to provide a CD storage rack system which can accommodate a large and varied number of CDs.

Another object of this invention is to provide such a CD storage mechanism in which the edges and front surfaces of the CDs may be easily observed in order to determine the contents thereof.

Yet another object of this invention is to provide such an adjustable CD support rack which is attractive, easy to use and will not mar surfaces on which the storage rack is placed.

Still another object of this invention is to provide a flip through CD storage rack which can accommodate double albums which are twice the normal thickness of single CD albums.

Another object of this invention is to provide such a CD storage rack which is attractive, readily usable, easily adjusted and susceptible to wide consumer use.

Other objects, advantages and features of this invention will become more apparent from the following description.

SUMMARY OF THE INVENTION

In accordance with the principles of this invention, the above objects are accomplished by providing an adjustable CD storage rack assembly comprising a pair of side supports angled outwardly with respect to each other approximately 50°-70° with respect to a horizontal surface, the side supports comprising apertures therethrough and a plurality of connecting rods connecting the side supports through the apertures. The material forming the apertures is resilient, and a friction fit is employed between the rods and apertures so that the side supports may be slidably and fixably located along the rods with respect to each other to be able to adjust the size of the adjustable CD storage rack.

The angle of the side supports is such that a side edge and front surface of a CD may be easily viewed in order to determine the contents thereof. The side supports comprise a rigid plate attached to a softer resilient rubber rest, with the rubber rest insuring that the resilient plate is located above the surface upon which the storage rack is placed. This prevents marring of such surfaces. Additionally, the rubber or resilient rest includes apertures aligned with apertures in the plate so that the connecting rods are frictionally held within the apertures of the side supports in order to achieve adjustability of the CD storage rack.

BRIEF DESCRIPTION OF THE DRAWINGS

FIG. 1 is a top plan view of the adjustable CD storage rack of this invention;

FIG. 2 is a side view of the storage rack of this invention;

FIG. 3 is a left end view of the storage rack of this invention;

FIG. 4 is a bottom view of the storage rack of this invention;

FIG. 5 is a right side view of the storage rack of this invention;

FIG. 6 is a perspective view of the storage rack of this invention;

FIG. 7 is an exploded perspective view, showing a side support of this invention;

DETAILED DESCRIPTION

Figure 8:
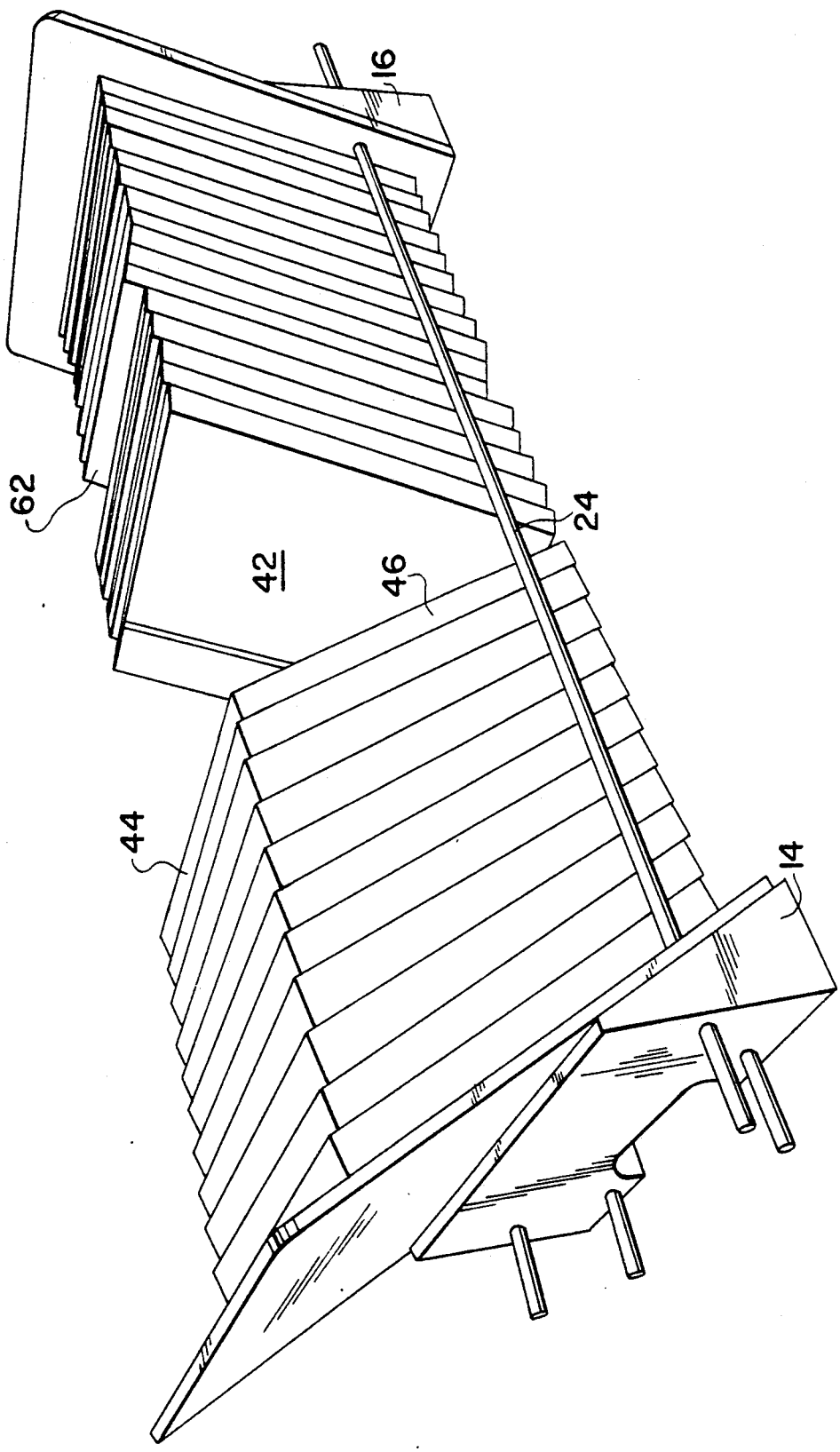
FIG. 8 is a perspective view showing a plurality of CDs stored in the storage rack of this invention.

The adjustable CD storage rack of this invention utilizes well-known principles employed in a conventional linear Rolodex in which a plurality of cards are stored one behind the other with the ability to flip through each card sequentially, or as desired, to observe information on the card.

FIGS. 1-8 are as described above and reference is made to those figures hereinafter. Numerals are used throughout the figures. The CDs form no part of the invention.

The storage rack 10 of this invention holds a plurality of compact disks 12 stored side-by-side. A storage rack comprises end supports 14 and 16 and a plurality of connecting rods 18, 20, 22, and 24. The end supports 14 and 16 each have respective apertures 26, 28, 30, 32, 34, 36, 38 and 40, with respective pairs of apertures 26-34, 28-36, 30-38, 32-40 in the respective side supports aligned with each other to receive connecting rods 18, 20, 22 and 24.

The side supports are angled with respect to a horizontal plane at an angle of between 50°-70°. By providing such an angle for the side supports, the CDs may be stored such that the front face 42 and side edges 44 and 46 of the centermost and separated CDs may be readily observable. This allows the user to have easy access and flip-through action in order to select the CD to be played.

The overall storage rack is extremely efficient in that substantially most of the space of the storage rack is taken up with the stored CDs.

A feature of this invention is that the apertures through which the connecting rods slide comprise, at least partially, resilient material so that side supports are able to be slid yet fixably held in position along the lengths of the connecting rods in order to adjust the spacing between the side supports and accommodate any desired number of CDs.

Preferably, the connecting rods are anodized aluminum and the end supports 14 and 16 could be made of a single material. At this point, FIG. 7 illustrates an exploded perspective of the end supports which each comprise a rigid rectangular plastic plate 48 having a planar front surface 50 and a rearwardly extending L-shaped support member 52 integrally formed therewith and a rubber rest 54 having an angled front surface 56 adapted to bear against the rear planar surface 58 of the plastic plate 48. The rubber rest further has a semi oval recess 60 terminating in a support surface 62 complementary in shape to the L-shape of the support member 52. The rubber rest 54 is lifted onto support member 52 of the rigid plate so as to connect the rubber rest 52 with the rigid plate 48 to provide the desired angle for the rigid plate to support the CDs. The rubber support has a plurality of apertures (designated with primed numerals) which align with the apertures in the rigid plate so that the connecting rods pass easily through the plastic plate and are resiliently and fixedly held by the apertures in the resilient rubber rest in order to achieve the slidable adjustable setting of the end supports 14 and 16 with respect to each other to adjust the sides of the storage rack of this invention.

Rubber rest 54 holds plate 48 above the bottom of the rubber rest to prevent the plastic plate from marring the surface on which the support rack rests.

Figure 9:
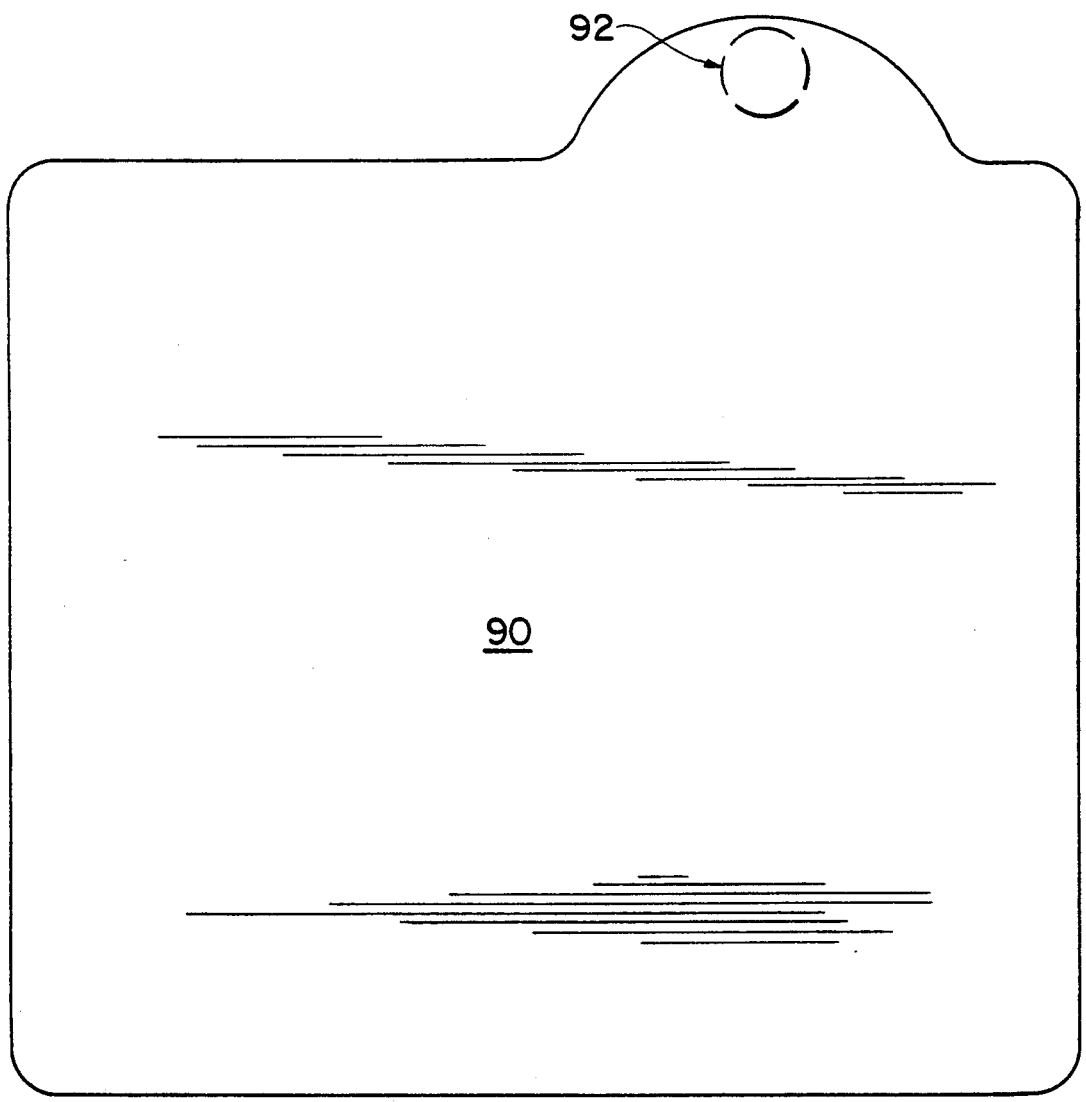
FIG. 9 is a plan view of separators to be used with the rack of this invention.

As stated above, the general principle of a linear Rolodex is employed in which the stored CDs can easily be flipped one after the other to determine which CD is desired. FIG. 9 illustrates yet another aspect of this invention in which a plurality of separators 90 is provided which are substantially of the same size as the CDs, but which include headers 92 which can carry information such as alphabetical, indexing, categories or the like in order to store the CDs in any fashion desired.

As a feature of this invention, double albums 62 of twice the normal thickness of a single CD can be accommodated with the storage rack 10 in which the flip through feature is still maintained.

This invention illustrates a preferred embodiment of this invention, the scope of which is set forth in the appended claims.

I claim:

1. A CD storage rack comprising a pair of end supports tilted outwardly with respect to said storage rack, connecting means connected between said end supports to form a support rack to hold said CDs at an angle such that an angle and the front surface may be easily observed, means to adjust the spacing of said end supports to accommodate a desired number of DCs to be stored on said storage rack, said connecting means comprising a plurality of rods, said end supports comprising apertures aligned to receive said rods, said rods frictionally engaging said apertures enabling said end supports to be slidably and fixably set with respect to each other, said apertures comprising resilient material allowing said rods to slide and yet be fixably set in position, said resilient material bearing on said rods as said rods pass through said apertures.

2. A CD storage rack, as set forth in claim 1, wherein said rods form supporting means for said CDs, said CDs preferably being held on said rack side-by-side on said rods with said edge of the CD facing upwardly.

3. A CD storage rack, as set forth in claim 1, wherein said end supports are inclined outwardly at approximately 50°-70° with respect to the horizontal.

4. A CD storage rack, as set forth in claim 1, wherein each of said end supports comprises a rigid plate on which said CDs rest and rest means for each of said plates.

5. A CD storage rack, as set forth in claim 4, wherein each of said rest means maintains a respective one of said plates above the bottom of said storage rack to prevent said plates from marring surfaces upon which said storage rack is placed.

6. A CD storage rack, as set forth in claim 4, wherein said rest means comprise a rubber material including a recess, said plate comprising a support member slidable into said recess to connect said rest means to said plate.

7. A CD storage rack, as set forth in claim 4, wherein said rest means and said plates comprise aligned apertures to receive said connecting means, said rest means located on the outer side of each plate with the CDs resting on the facing sides of said plates, said rest means comprising a resilient material which frictionally engages said connecting means permitting said end supports to be slidably and fixably moved with respect to each other along said connecting means.

8. A CD storage rack, as set forth in claim 5, wherein said connecting means comprises a plurality of rods supported in parallel between said end supports for the rack on which the CDs are placed.

9. A CD storage rack, as set forth in claim 1, wherein said end supports comprise handle means to facilitate moving said storage rack.

* * * * *